United States Patent
Schneider (10) Patent No.: US 10,820,265 B2
(45) Date of Patent: Oct. 27, 2020

(54) IOT DEVICE CONNECTIVITY PROVISIONING

(71) Applicant: NOKIA TECHNOLOGIES OY, Espoo (FI)

(72) Inventor: Peter Schneider, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/340,027

(22) PCT Filed: Oct. 7, 2016

(86) PCT No.: PCT/FI2016/050697
§ 371 (c)(1),
(2) Date: Apr. 5, 2019

(87) PCT Pub. No.: WO2018/065660
PCT Pub. Date: Apr. 12, 2018

(65) Prior Publication Data
US 2020/0045549 A1    Feb. 6, 2020

(51) Int. Cl.
*H04W 48/18* (2009.01)
*H04W 4/60* (2018.01)
(Continued)

(52) U.S. Cl.
CPC .............. *H04W 48/18* (2013.01); *H04W 4/50* (2018.02); *H04W 4/60* (2018.02); *H04W 4/70* (2018.02);
(Continued)

(58) Field of Classification Search
CPC ...................................................... H04W 12/08
(Continued)

(56) References Cited

U.S. PATENT DOCUMENTS

2010/0106967 A1    4/2010  Johansson et al.
2011/0136482 A1    6/2011  Kaliner
(Continued)

FOREIGN PATENT DOCUMENTS

EP          3065432 A1    9/2016
WO    2009/092115 A2    7/2009

OTHER PUBLICATIONS

International Search Report and Written Opinion dated Jun. 12, 2017 corresponding to International Patent Application No. PCT/FI2016/050697.
(Continued)

*Primary Examiner* — Joel Ajayi
(74) *Attorney, Agent, or Firm* — Squire Patton Boggs (US) LLP (57) ABSTRACT

Internet of Things devices are provisioned with programmable subscriber units by arranging a secure end-to-end connection with an IoT Application Server IoTAS with a temporary connection through a mobile network that has been previously informed of the identities of the IoT devices. Through the secure end-to-end connection, the IoTAS provides an IoT device with provisioning information that enables mutual authentication between the mobile network and the IoT device so that the IoT device can be equipped with a programmable subscription that enables the IoT device to normally attach to the mobile network.

20 Claims, 3 Drawing Sheets

(51) Int. Cl.
  *H04W 4/70* (2018.01)
  *H04W 4/50* (2018.01)
  *H04W 12/08* (2009.01)
  *H04W 12/00* (2009.01)

(52) U.S. Cl.
  CPC .......... *H04W 12/08* (2013.01); *H04W 12/001* (2019.01)

(58) Field of Classification Search
  USPC ........................................................ 455/411
  See application file for complete search history.

(56) References Cited

U.S. PATENT DOCUMENTS

2014/0329502 A1    11/2014   Lee et al.
2016/0134318 A1*   5/2016   Wane ...................... H04W 4/50
                                                                             455/558

OTHER PUBLICATIONS

3GPP TR 33.812 V1.4.0 (Jun. 2009), Technical Report, 3rd Generation Partnership Project; Technical Specification Group Services and System Aspects; Feasibility Study on the Security Aspects of Remote Provisioning and Change of Subscription for M2M Equipment; (Release 9), Jun. 2009.
European Search Report corresponding to EP 16918205.2, dated Mar. 18, 2020.

* cited by examiner

IOT DEVICE CONNECTIVITY PROVISIONING

TECHNICAL FIELD

The present application generally relates to provisioning connectivity for Internet of Things devices.

BACKGROUND

This section illustrates useful background information without admission of any technique described herein representative of the state of the art.

Internet of Things (IoT) should radically increase the number of devices that have Internet connectivity. In order for the IoT devices to be able to communicate, e.g. with an IoT application server, each device must be somehow provided with connectivity. Not only do these devices require suitable hardware for wireless communication, for example, but they further require some authorizing information to gain access to the networks. It is notable that wireless networks cannot verify the authorization to use simply by their access to a given connector but unlike wired phone lines typically some signaling is required for authorization.

In case of wireless local area networks, the authorization is typically provided by use of some static secret information such as a combination of an access point identifier and access code. In case of mobile networks or cellular networks, the authorization procedure is usually more robust and employs some kind of a challenge-response mechanism i.e. non-static secret information.

The IoT devices can make use of any Internet access available to them, but most easily wireless networks. In case of cellular networks, the IoT devices need to be provided with a subscription module such as a SIM or USIM. Such an authentication can be implemented as a smart card chip based application, but alternatively also programmatically on some secure platform. With a programmatically implemented subscription module, subscriber devices can be coded to be operable with a given mobile network operator. As with a hardwired subscription module, the operator needs to associate each subscription with a payee, i.e. an account from which the use of the subscription is charged. As the IoT devices are expected to be deployed in huge quantities, it appears that plenty of work will be required to provide each IoT device with a hardwired subscription module or programmatic subscription module.

SUMMARY

Various aspects of examples of the invention are set out in the claims.

According to a first example aspect of the present invention, there is provided a method in equipment of an Internet of Things Application Operator, as set forth herein.

According to a second example aspect of the present invention, there is provided a method in equipment of a first network operator, as set forth herein.

According to a third example aspect of the present invention, there is provided a method in a first device that is an Internet of Things Device, as set forth herein.

According to a fourth example aspect of the present invention, there is provided equipment of an Internet of Things Application Operator, as set forth herein.

According to a fifth example aspect of the present invention, there is provided equipment of a first network operator of a first mobile communication network, as set forth herein.

According to a sixth example aspect of the present invention, there is provided an Internet of Things Device, as set forth herein.

According to a seventh example aspect of the present invention, there is provided a computer program for controlling equipment of an Internet of Things Application Operator, as set forth herein.

According to an eighth example aspect of the present invention, there is provided a computer program for controlling equipment of a first network operator of a first mobile communication network, as set forth herein.

According to a ninth example aspect of the present invention, there is provided a computer program for controlling an Internet of Things device, set forth herein.

According to a tenth example aspect of the present invention, there is provided a computer readable memory medium storing the computer program of any example aspect.

The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferro-electric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. The memory medium may be a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings. In this document, like reference signs denote like parts or steps.

Figure 1:
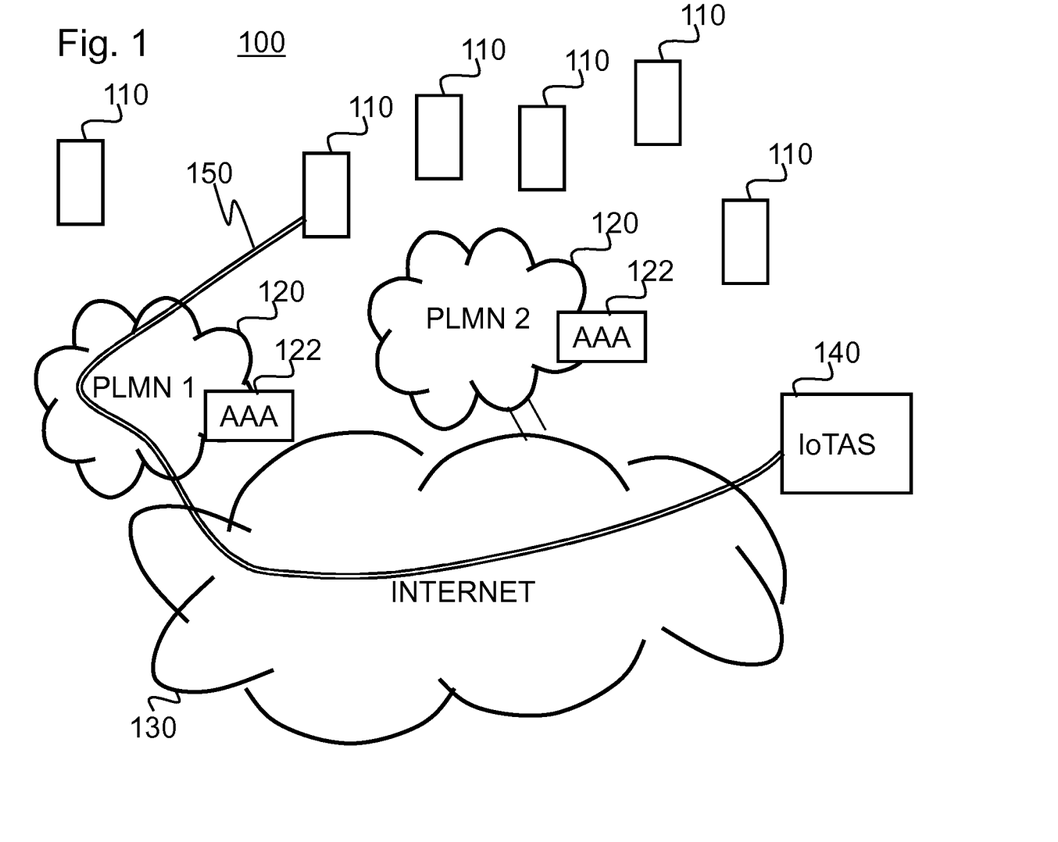
FIG. 1 shows an architectural drawing of a system of an example embodiment.

FIG. 1 shows an architectural drawing of a system of an example embodiment. FIG. 1 depicts a plurality of machine type devices, MTD, or Internet of Things devices 110 (such as cars, vending machines, sensors, fridges, bicycles, coffee machines, tags, for example). FIG. 1 shows only few such devices while in practice there can be thousands or even millions of such devices in within the range of one or two mobile communication networks 120. FIG. 1 further illustrates the Internet, public land mobile networks 120 or mobile communication networks and an Internet of Things Application Server, IoTAS 140 of an Internet of Things Application Operator, IoTAO (not shown). Strictly speaking, the IoTAO may be an organization, but the IoTAO may also be used as a shortcut to refer to the equipment of the IoTAO.

In this context, a mobile communication network or a network in short refers to the entire network of an operator, possibly over more than one countries and/or continents. The devices or MTDs 110 can be within the coverage of either, both, or neither of the networks PLMN 1 and PLMN 2. In sake of demonstration, one of the MTDs 110 is connected with a double line to the IoTAS through the PLMN 1 indicative of a connection formed through the network PLMN 1. This connection and the operation of various parts will be described with more detail after first briefly describing an example of the architecture and of possible structures of the MTDs and of the IoTAS.

Figure 2:
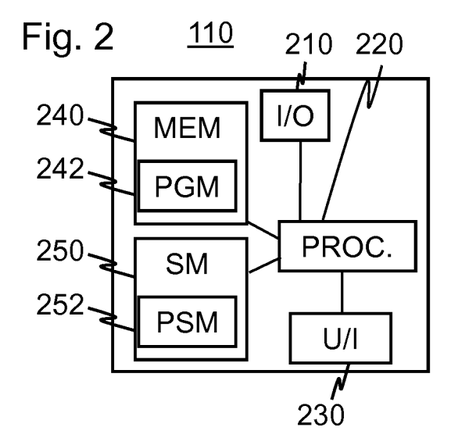
FIG. 2 shows a block diagram of a machine type device of an example embodiment.

FIG. 2 shows a block diagram of a machine type device 110 of an example embodiment. The block diagram is simplified to show some major parts that are useful for understanding connectivity of the MTD 110. The parts of the MTD 110 that relate to its actual function, be it a sensor, actuator or some other device such as a car or coffee machine, can be implemented in any of the known ways.

The MTD 110 comprises an input/output circuitry 210 configured to communicate with a data network such as the networks 120. As such, the input/output circuitry of FIG. 2 comprises, for example, a user equipment that is compatible with a 3G, 4G or (future) 5G standard such as the W-CDMA or CDMA-2000. Additionally, the MTD 110 of FIG. 2 comprises a processor 220 configured to control operating of the MTD 110 and an optional user interface 230 in case that the MTD 110 needs a man-machine interface. The MTD 110 further comprises a memory 240 comprising computer software 242 such as one or more programs or generally computer executable program code configured to cause the processor 220 to control the MTD 110 as desired. The MTD 110 further comprises a programmable subscriber module PSM 252 that is here stored by a security module 250. The security module 250 is a secured execution environment the access to which by software and/or hardware attacks is hindered. For example, the security module 250 may comprise any of a dedicated processor, a dedicated memory and a dedicated data bus, configured to allow the security module 250 to operate as in an isolated sandpit. In some other embodiments, the programmable subscriber module 252 is stored in a common memory with the computer software and/or some other data. The programmable subscriber module 252 may be, for example, a Universal Subscriber Identity Module (suited for use with 3G or 4G networks) or a Subscriber Identity Module suited for use with the Global System for Mobile communications, GSM. Thanks to the programmability, the MTD 110 can be adapted to subscribe to any network with which the MTD 110 has hardware compatibility. The programmable subscriber module 252 is provisionable over-the-air so that the MTD 110 can be provided with connectivity after taking into use.

The processor 220 comprises, for example, any one or more of: a master control unit (MCU); a microprocessor; a digital signal processor (DSP); an application specific integrated circuit (ASIC); a field programmable gate array; and a microcontroller.

Figure 3:
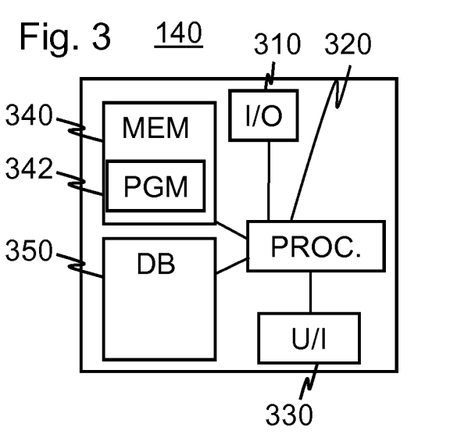
FIG. 3 shows a block diagram of an Internet of things application server of an example embodiment.

FIG. 3 shows a block diagram of an Internet of things application server, IoTAS 140, of FIG. 1. The IoTAS 140 comprises, similarly with the MTD 110, an input/output circuitry 310, a processor 320, a user interface 330, a memory 340, software 342 and a database 350. In comparison to the MTD 110, the IoTAS is yet more powerful in order to be capable to perform numerous simultaneous server operations.

It is worth noting at this stage that unless otherwise stated, each element or step disclosed herein can be implemented in one or more parts i.e. using distribution, replication or parallel processing. Likewise, more than one elements or steps can also be combined to one element or step, depending on the implementation.

The database 350 comprises, for example, a list of all MTDs operated by the IoTAO and identifications of assigned network operators in the networks of whose the MTDs are designed to operate.

The IoTAS 140 and the networks 120 are configured to be able to establish a secure communication channel for controlling provisioning of the MTDs of the IoTAS 140.

Figure 4:
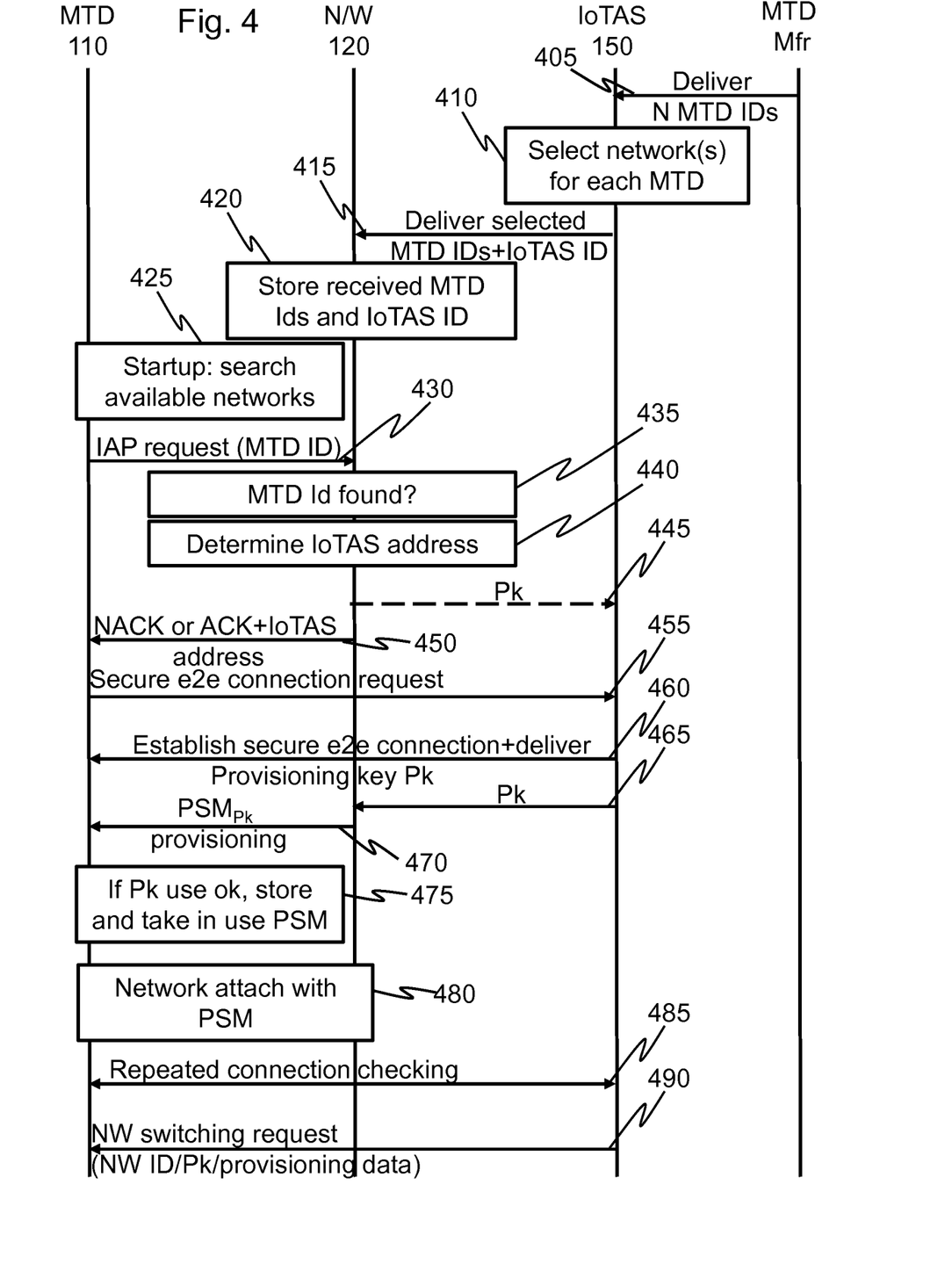
FIG. 4 shows an event chart of an example embodiment.

FIG. 4 shows an event chart of an example embodiment. FIG. 4 presents some major events and signals that may occur.

Let us assume that a batch of 100 000 MTDs 150 are manufactured and a particular IoT application operator IoTAO is assigned (at some stage, e.g. on import to a given country) as their operator. The identities of these MTDs 150 are delivered 405 to the IoTAS of the IoTAO in question. Notice that we now consider the part of one given IoTAO. There may well be other IoTAOs with their own IoTAS or even in some cases more than one IoTAO may employ same IoTAS, but after step 405, the IoTAS 150 has the MTD identities for the batch that was now assumed to be of 100 000 MTDs. The IoTAS may conveniently store these MTD IDs in its database 350, for example so that they are easily searchable at later stages.

In one example embodiment, the MTD IDs are International Mobile Equipment Identities i.e. IMEI-codes or IMEI-SV (software version) codes.

The IoTAS next selects 410 one or more networks for each MTD. In an example embodiment, the IoTAS attempts to select for each MTD networks for the entire geographical area in which the MTDs should be usable. For example, the MTDs may be intended for marketing for global use in which case networks should be selected suitably for global coverage. In another example, the MTDs are intended for only regional or national use so that it suffices to select one or few networks to cover the desired area.

The IoTAS then delivers 415 the selected MTD identities (MTD IDs) to the selected networks. To this end, the IoTAS employs secure connections with these networks. These secure connections are formed in an example embodiment using dedicated physical channels to which unauthorized parties have no access. Alternatively or additionally, cryptographic measures can be used to secure the communication between the IoTAS and the networks, such as public key encryption that may also conveniently provide proof of authenticity, integrity and confidentiality of communication.

The network 120 receives a plurality of MTD IDs sent to it by the IoTAS and stores 420 the received MTD IDs as associated with the IoTAS 150. If the network 120 only co-operates with one IoTAS 150, then the association is inherent, otherwise the network 120 can be arranged to store an identifier of the IoTAS in question.

These steps 405 to 420 prepare the network 120. At some stage, one of the MTDs, a first device or MTD 110 in brief, is taken into use by someone somewhere. The MTD 110 starts up 425 and begins to search for networks. For example, the MTD 110 may start listening to common pilot channels used by base stations of mobile networks in order to find out which networks could provide service to the MTD 110. At this stage, the MTD is not yet provisioned with a subscriber module so that it is unable to perform a normal network registration that mobile phones perform before they can make calls other than emergency calls.

The MTD detects one or more available networks and then begins an initial attach procedure IAP to attempt obtaining connectivity through a detected network by sending to that network an IAP request that contains the MTD ID. The order in which different networks are selected for attempt can be freely chosen, but in an example embodiment, networks with strongest signal levels are prioritized to reduce communication error risk.

The network 120 checks 435 whether the MTD ID is assigned to that network for example by searching the MTD ID from its database. If no, then the network 120 would respond by a NACK message at step 450, otherwise the network 120 would next help the MTD 110 to establish initial connectivity with the IoTAS 150. To this end, the network 120 may either build a temporary channel to the IoTAS 150 or simply determine 440 a network address of the IoTAS 150 and supply that address with an ACK message in step 450 to the MTD 110 plus provide initial access for the MTD 110 solely to that address. A secure end-to-end connection can then be requested 455 by the MTD 110 from the IoTAS 150 using its address and subsequently established 460 by the IoTAS 150. This secure end-to-end connection may be established temporarily only for the duration needed to complete the IAP process. During this period, the MTD 110 may lack all other connectivity through the network 120.

A secure end-to-end connection is established between the IoTAS 150 and the MTD 110 using, for example, application layer security (e.g. shared secret, public key encryption, the procedure used for eNB enrolment (e.g. 3GPP TS 33.310, Clause 9), and a provisioning key Pk is provided from the IoTAS 150 to the MTD 110. The IoTAS 150 obtains the provisioning key Pk e.g. by using a random number generator or by selecting a previously generated provisioning key, or in an example embodiment the IoTAS 150 receives 445 the Pk from the network 120. For example, the network 120 can be configured to generate a provisioning key Pk for each MTD ID received from the IoTAS and responsively send back the generated provisioning keys Pk. In this case, the IoTAS would not need to subsequently inform the network of the provisioning key Pk in step 465 (described in the following).

Providing connectivity need not mean to support a specific protocol run between the MTD 110 and the IoTAS 150. Between the network 120 and the IoTAS 150, any suitable transport protocol can be used, e.g. Generic Routing Encapsulation, GRE. Protocol data units of the protocol used between MTD 110 and IoTAS 150 can be transported using a network specific protocol (e.g. PDCP in LTE) over the radio interface and then be tunneled to the IoTAS 150 using e.g. GRE.

After the secure end-to-end connection is established between the MTD 110 and the IoTAS 150, the IoTAS passes the provisioning key Pk to the network over its secure connection with the network 120, 465 (unless the network 120 already is aware of the provisioning key Pk). Then, the network 120 and the MTD 110 both possess the provisioning key Pk and the network 120 can send to the MTD 110 programmable subscriber module data secured with the provisioning key Pk, 470. For example, the programmable subscriber module or some (confidential part) thereof can be encrypted using the provisioning key Pk as an encryption key, as a portion of the encryption key (the MTD ID, for example, or some replay attack protection code initially set by the MTD 110, could be used to form some part of the encryption key). As the provisioning key Pk is sent to from the IoTAS 150 to the MTD 110 and to the network 110 over respective secure connections, third parties should not be able to capture that key from either of such communications (460,465). The MTD 110 can thus ensure that the network is trusted the IoTAS 150 by using the fact that the network 120 knows Pk as a proof that the network 120 was trusted by the IoTAS 150 after the IAP request was sent, assuming that the provisioning key Pk is not static but varied e.g. by randomizing for each IAP. Moreover, the network 120 can use the fact that the MTD knows Pk as a proof that the MTD 110 is trusted by the IoTAS as a valid MTD associated to the IoTAS. If both MTD 110 and network 120 were in possession of the provisioning key, the provisioning of the subscriber module is completed by the MTD 110 updating its security module by storing the received programmable subscriber module, 470. The MTD 110 can then attach 480 to the network 120 using the normal network attach procedure of the network 120 using the updated subscriber module so that normal security features such as encryption of the network connection are used.

After successful registration to a network 120, the MTD has its connectivity through that network 120 as long as the network continues to service the MTD 110. However, the network 120 might cease to service the MTD 110 for various reasons such as that the IoTAO would have chosen to switch the network 120 used for the MTD 110. Such a network switching could be useful for various reasons such as connectivity or pricing related reasons. In order to maintain control on the MTD 110, the MTD 110 is configured in an embodiment to repeatedly (e.g. periodically and/or in response to some events such as not receiving expected responses from other parties) check its connection with the IoTAS, 485. For example, the MTD 110 can be configured to send a message via the secure end-to-end connection and to verify that it receives an expected response. After a predetermined time without connectivity to the IoTAS, the MTD 110 performs network switching 490. In an example embodiment, the MTD 110 then re-executes the IAP in an embodiment, i.e. the procedure may resume to step 425. This time, the MTD 110 may prefer other networks than the one it previously used.

In an example embodiment, the MTD 110 is requested by the IoTAS 150 to perform an inter-network switch. Such a request could be received in response to the repeated connection check of the MTD 110. In this case, the IoTAS 150 need not acquire and maintain network addresses of all the MTDs operated by the IoTAO (or of those MTDs that have acquired network connectivity). Alternatively, the IoTAS can be configured to acquire and maintain the network addresses of the MTDs with network connectivity. Responsive to the inter-network switching request, the MTD 110 could record that it should no longer user the network 120 and restart the IAP process by resuming to step 425 this time intentionally avoiding the network 120. In an example embodiment, the inter-network switching request specifies a new network to use or blacklists one or more networks not to use.

In an example embodiment, the inter-network switching is accelerated by containing in the inter-network switching facilitating information. The facilitating information may comprise any of a desired new network identification; a provisioning key readily informed to the new network by the IoTAS 150; or new subscriber module data in case that the IoTAS has readily acquired these data from the new network in which case the MTD 110 could update its subscriber module and then register to that network without need to repeat the IAP. In an example embodiment, roaming of the MTDs 110 is facilitated by maintaining by different partnered mobile network operators a joined database of the MTD IDs that contains the MTD IDs together with an indication of their home networks. In this context, roaming may refer to performing the IAP in a visited network that is not the intended home network.

In this case, the MTD ID appearing in the IAP request could be detected to belong to a roaming partner and the procedure could be continued such that the network 120 could obtain the subscriber module and perform the provisioning on behalf of a home network assigned to the MTD 110. Alternatively, the network 120 could be configured so that in case of an MTD 110 assigned to a roaming partner network, the network 120 would enable connectivity with that network and direct the MTD 110 to request and receive the provisioning 470 from the home network. The secure end-to-end connection with the IoTAS 455 could then be routed via the home network or formed directly between the MTD 110 and the IoTAS 455.

Figure 5:
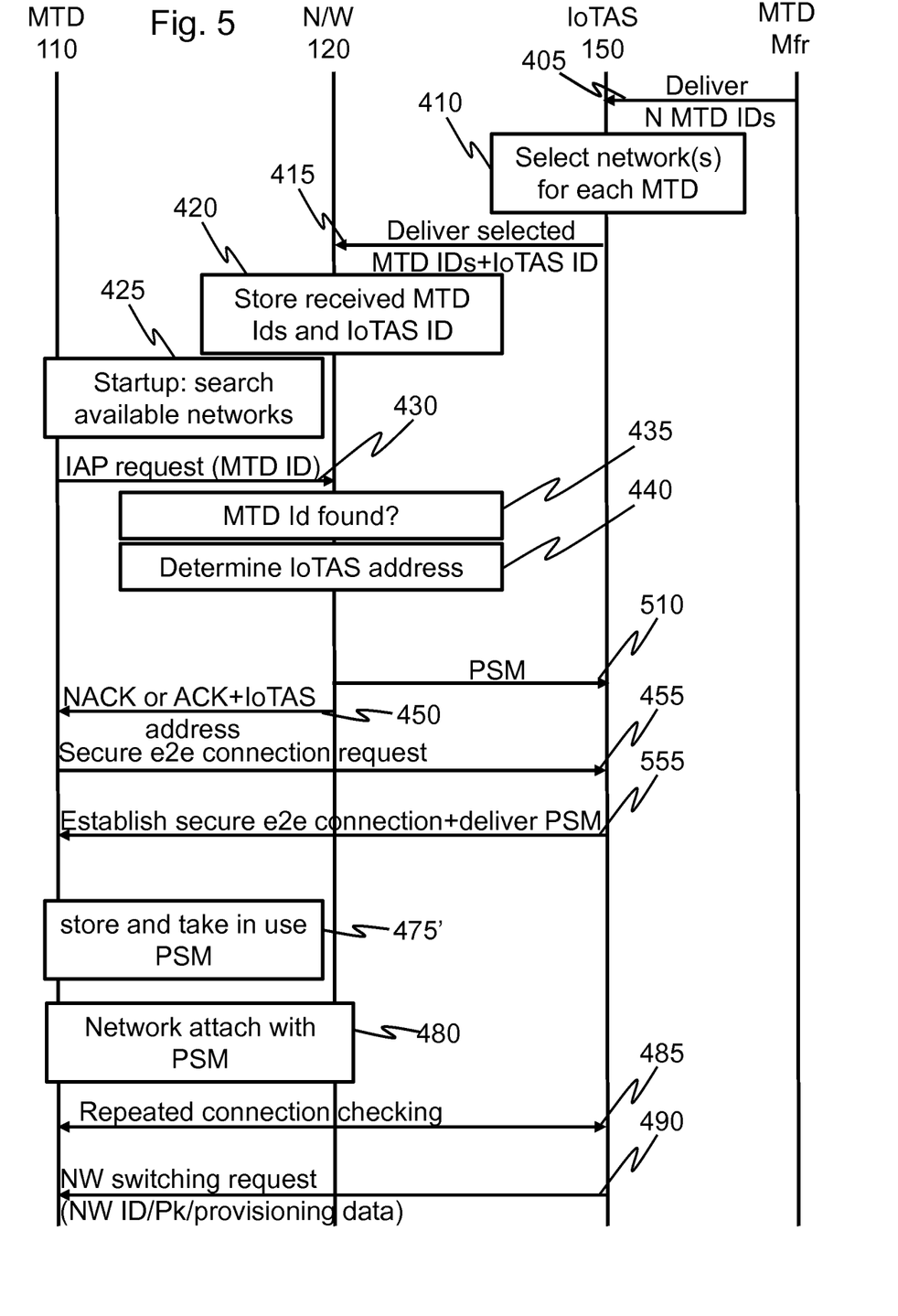
FIG. 5 shows an event chart of an example embodiment.

FIG. 5 shows an event chart of an example embodiment. FIG. 5 corresponds to FIG. 4 except that in FIG. 5, the network 120 provides 510 the PSM to the IoTAS 150 and the provisioning key is not exchanged at all between the secure connections (MTD-network, network-IoTAS). That the IoTAS 150 provides the PSM over the secure end-to-end connection indicates to the MTD that the IoTAS 150 trusts the network that acts as the carrier of the secure end-to-end connection. In step 475', the PSM received from the IoTAS 150 is taken into use by the MTD 110.

In an example embodiment, Internet of Things devices are provisioned with programmable subscriber units by arranging a secure end-to-end connection with an IoT Application Server IoTAS with a temporary connection through a mobile network that has been previously informed of the identities of the IoT devices. Through the secure end-to-end connection, the IoTAS provides an IoT device with provisioning information that enables mutual authentication between the mobile network and the IoT device so that the IoT device can be equipped with a programmable subscription that enables the IoT device to normally attach to the mobile network.

Without in any way limiting the scope, interpretation, or application of the claims appearing below, a technical effect of one or more of the example embodiments disclosed herein is that IoT devices can be manufactured and deployed without need for physical access for subscription module insertion or adaptation. Another technical effect of one or more of the example embodiments disclosed herein is that delivered IoT devices can be centrally transferred from one network to another. Yet another technical effect of one or more of the example embodiments disclosed herein is that delivered IoT devices can be automatically transferred from one network to another in case of a network failure.

Embodiments of the present invention may be implemented in software, hardware, application logic or a combination of software, hardware and application logic.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An equipment of an internet of things application operator, comprising:
   a data storage configured to store a device identity for each of a plurality of Internet of Things devices including a first internet of things device;
   at least one processor; and
   at least one memory including computer program code;
   the at least one memory and the computer program code configured to, with the at least one processor, cause the equipment of an internet of things application operator, at least to:
   establish a cryptographically secured end-to-end communication connection with the first internet of things device through a mobile communication network of a first network operator;
   obtain provisioning information associated with the first internet of things device, which provisioning information enables equipping the first internet of things device with a programmatic subscription module of the mobile communication network, wherein the provisioning information is obtained from at least one of a random number generator in which the random number is associated with key, selecting a previously generated provisioning key, and the mobile communication network;
   provide the provisioning information to the first internet of things device over the cryptographically secured end-to-end communication connection; and
   based on a failure detection, transmit an inter-operator switching request to the first internet of things device, wherein
      the inter-operator switching request specifies a new mobile communication network operator to use instead, wherein
      the inter-operator switching request further comprises new provisioning information for the new mobile communication network.

2. The equipment of an internet of things application operator of claim 1, wherein the at least one memory and the computer program code are further configured to cause the equipment of an Internet of things application operator at least to provide the first network operator with a list of device identities associated with the application operator.

3. The equipment of an internet of things application operator of claim 1,
   the provisioning information comprising a provisioning key for the first device; and wherein the at least one memory and the computer program code are further configured to cause the equipment of an internet of things application operator at least to:
   send the provisioning key to the first internet of things device over the cryptographically secured end-to-end communication connection; and provide the provisioning key to the first network operator to enable the first network operator to prove right to provision the first internet of things device with a programmatic subscription module and to ensure that the internet of things application operator is responsible for the first Internet of things device.

4. The equipment of an internet of things application operator of claim 1, wherein:
the provisioning information comprises the programmatic subscription module; and
the obtaining of the provisioning information comprises obtaining the programmatic subscription module from the mobile communication network.

5. An equipment of a first network operator, comprising:
a radio interface input configured to receive an initial attach procedure request from a first internet of things device that is provided with a device identifier;
at least one processor; and
at least one memory including computer program code;
the at least one memory and the computer program code configured to, with the at least one processor, cause the equipment of a first network operator at least to:
obtain the device identifier or a derivative thereof from the request;
determine an internet of things application operator associated with the first internet of things device;
establish a cryptographically secure communication channel between the first internet of things device and equipment of the internet of things application operator associated with the first internet of things device;
transport over the communication channel from the equipment of the internet of things application operator to the first internet of things device provisioning information associated with the first internet of things device, which provisioning information enables equipping the first internet of things device with a programmatic subscription module of the mobile communication network;
attach to the first internet of things device; and
based on a failure detection, receiving an inter-operator switching request from the internet of things application operator and sending the inter-operator switching request to the first internet of things device, wherein
the inter-operator switching request specifies a new mobile communication network operator to use instead, wherein
the inter-operator switching request further comprises new provisioning information for the new mobile communication network.

6. The equipment of a first network operator of claim 5, wherein:
the provisioning information comprises a provisioning key.

7. The equipment of a first network operator of claim 6, the at least one memory and the computer program code being further configured to cause the equipment of a first network operator at least to:
receive the provisioning key from the equipment of the internet of things application operator associated with the first device; and
provision the first internet of things device with a programmatic subscription module using the provisioning key as a provisioning authenticator configured to show a trusted relationship between the network operator and the internet of things application operator associated with the first internet of things device and to ensure that the internet of things application operator is responsible for the first internet of things device.

8. The equipment of a first network operator of claim 7, wherein the ensuring comprises decrypting the programmatic subscription module using the provisioning key.

9. The equipment of a first network operator of claim 5, wherein the provisioning information comprises the programmatic subscription module.

10. The equipment of a first network operator of claim 6, the at least one memory and the computer program code being further configured to cause the equipment of a first network operator at least to provide the provisioning information to the equipment of the internet of things application operator associated with the first internet of things device before the establishing of the communication channel between the first internet of things device and equipment of the internet of things application operator associated with the first internet of things device.

11. The equipment of a first network operator of claim 5, the at least one memory and the computer program code being further configured to cause the equipment of a first network operator at least to restrict communication, resulting from the initial attach procedure request between the first internet of things device and the equipment of the internet of things application operator to an extent required for mutual authentication and transmission of the provisioning information.

12. The equipment of a first network operator of claim 11, the at least one memory and the computer program code being further configured to cause the equipment of a first network operator at least to perform the restricting of the communication by allowing transport of data for predetermined time interval or amount of data.

13. An internet of things device, comprising:
a data storage configured to maintain a device identifier associated with the internet of things device;
at least one processor; and
at least one memory including computer program code;
the at least one memory and the computer program code configured to, with the at least one processor, cause the internet of things device at least to perform a process comprising:
identifying an available mobile communication network, the available mobile communication network being referred to as a first network and being operated by a first network operator;
forming an initial attach procedure request comprising the device identifier or a derivative thereof;
sending the initial attach procedure request to the first network;
checking whether the first network establishes a communication channel between the apparatus and equipment of an internet of things application operator associated with the internet of things device within a predetermined duration, and when yes:
establishing, through the first network, a cryptographically secured end-to-end communication connection with equipment of the internet of things application operator associated with the internet of things device;
receiving a provisioning information over the cryptographically secured end-to-end communication connection from the equipment of the internet of things application operator associated with the internet of things device;

obtaining a programmatic subscription module of the mobile communication network using the provisioning information;

attaching to the first network with the programmatic subscriber module and thereafter communicating through the first network;

detecting failure to proceed communicating through the first network;

after having communicated through the first network, receiving an inter-operator switching request from the internet of things application operator, wherein
the inter-operator switching request specifies a new mobile communication network operator to use instead, wherein
the inter-operator switching request further comprises new provisioning information for the new mobile communication network; and
obtaining a programmatic subscription module of the new mobile communication network using the new provisioning information.

14. The internet of things device of claim 13, wherein the provisioning information comprises the programmatic subscription module.

15. The internet of things device of claim 14, wherein the obtaining of the programmatic subscription module comprises:
obtaining a provisioning key from the provisioning information;
receiving from the first network the programmatic subscription module;
ensuring with the provisioning key that both the first operator and the internet of things device are trusted by the internet of things application operator and responsive to an affirmative result of the ensuring, configuring the internet of things device to take in use the programmatic subscription module.

16. The internet of things device of claim 15, wherein the ensuring comprises decrypting the programmatic subscription module using the provisioning key.

17. The internet of things device of claim 13, the at least one memory and the computer program code being further configured to cause the internet of things device at least to perform the process as often as necessary until a mobile communication network is found that establishes the communication channel between the internet of things device and the equipment of an internet of things application operator associated with the internet of things device and from which a validly authenticated provisioning request is subsequently received.

18. A non-transitory computer readable medium comprising program instructions for causing an equipment of an internet of things application operator to perform at least:
storing a device identity for each of a plurality of internet of things devices including a first internet of things device;
establishing a cryptographically secured end-to-end communication connection with the first internet of things device through a mobile communication network of a first network operator;
obtaining provisioning information associated with the first internet of things device, which provisioning information enables equipping the first internet of things device with a programmatic subscription module of the mobile communication network, wherein the provisioning information is obtained from at least one of a random number generator in which the random number is associated with a key, selecting a previously generated provisioning key, and the mobile communication network;
providing the provisioning information to the first internet of things device over the cryptographically secured end-to-end communication connection; and
based on a failure detection, transmit an inter-operator switching request to the first internet of things device, wherein
the inter-operator switching request specifies a new mobile communication network operator to use instead, wherein
the inter-operator switching request further comprises new provisioning information for the new mobile communication network.

19. A non-transitory computer readable medium comprising program instructions for causing an equipment of a first network operator of a first mobile communication network to perform at least:
receiving an initial attach procedure request from a first internet of things device provided with a device identifier;
obtaining the device identifier or a derivative thereof from the request;
determining an internet of things application operator associated with the first internet of things device;
establishing a cryptographically secure communication channel between the first internet of things device and equipment of the internet of things application operator associated with the first internet of things device;
transporting over the communication channel from the equipment of the internet of things application operator to the first internet of things device provisioning information associated with the first internet of things device, which provisioning information enables equipping the first internet of things device with a programmatic subscription module of the mobile communication network;
attach to the first internet of things device; and
based on a failure detection, receiving an inter-operator switching request from the internet of things application operator and sending the inter-operator switching request to the first internet of things device, wherein
the inter-operator switching request specifies a new mobile communication network operator to use instead, wherein
the inter-operator switching request further comprises new provisioning information for the new mobile communication network.

20. A non-transitory computer readable medium comprising program instructions for causing a first internet of things device perform at least the following:
maintaining a device identifier associated with the first internet of things device;
identifying an available mobile communication network, the available mobile communication network being referred to as a first network and being operated by a first network operator;
forming an initial attach procedure request comprising the device identifier or a derivative thereof;
sending the initial attach procedure request to the first network;
checking whether the first network establishes a communication channel between the first internet of things device and equipment of an internet of things application operator associated with the first internet of things device within a predetermined duration, and when yes:

establishing, through the first network, a cryptographically secured end-to-end communication connection with equipment of the internet of things application operator associated with the first internet of things device;

receiving a provisioning information over the cryptographically secured end-to-end communication connection from the equipment of the internet of things application operator associated with the first internet of things device; and obtaining a programmatic subscription module of the mobile communication network using the provisioning information;

attaching to the first network with the programmatic subscriber module and thereafter communicating through the first network;

detecting failure to proceed communicating through the first network;

after having communicated through the first network, receiving an inter-operator switching request from the internet of things application operator, wherein
 the inter-operator switching request specifies a new mobile communication network operator to use instead, wherein
 the inter-operator switching request further comprises new provisioning information for the new mobile communication network; and obtaining a programmatic subscription module of the new mobile communication network using the new provisioning information.

* * * * *